May 17, 1960    A. S. THORBERG    2,936,667
T-SLOT BOLT WITH SET SCREW HOLDING MEANS
Filed Dec. 12, 1955

ARNE S. THORBERG
    INVENTOR

BY Wenderoth, Lind & Ponack
    ATTORNEYS

United States Patent Office 2,936,667
Patented May 17, 1960

2,936,667

T-SLOT BOLT WITH SET SCREW HOLDING MEANS

Arne Siverth Thorberg, Svedala, Sweden

Application December 12, 1955, Serial No. 552,589

Claims priority, application Sweden January 7, 1955

2 Claims. (Cl. 85—9)

The present invention relates to T-slot bolts for securing workpieces to face plates or work tables in machine tools.

In many cases the workpieces have bolt holes, in which case the T-slot bolts are, of course, disposed in these in so far as this is possible. T-slot bolts of the types known hitherto are, however, unsuitable in such cases, since the bolts have a loose and wobbly fit in the slots due to their loose engagement, which makes it difficult to direct the bolts into the holes, particularly when it is the question of large and heavy workpieces in which several bolt holes can be used. Another drawback of the known T-slot bolts is that when several workpieces of the same kind are to be worked, the bolts have to be directed anew for each workpiece. This directing operation entails great loss of time and is besides risky for the person carrying it out.

The present invention relates to an improved T-slot bolt and its characteristic feature is that its head is made plane so as to be guided against the underside of the flanges forming the T-slot and is provided with at least one through locking screw intended to be applied against the bottom of the T-slot in order to fix the bolt at right angles to the face plate.

Thus, the T-slot bolts may be directed by means of a template of the contact surface of the work-piece against the face plate and be fixed in the slots by means of the locking screws disposed in the heads of the bolts, in which case the T-slot bolts can also be used as fixtures for several units of the same kind to be manufactured.

For the better understanding of the invention a preferred form thereof as applied to T-slot bolts will now be described by way of example with reference to the accompanying drawings.

On the drawings

Figure 1:
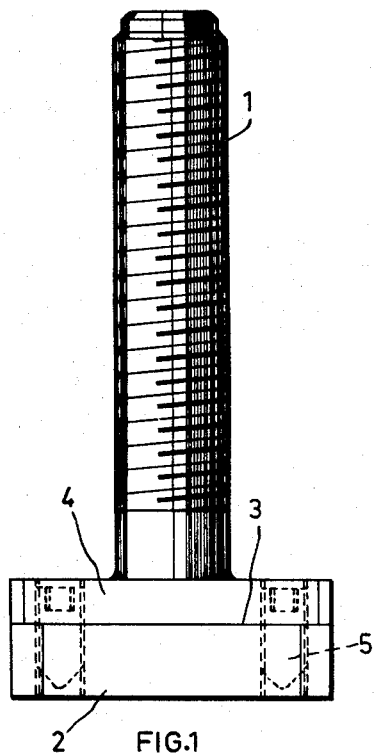
Fig. 1 is an elevation of a T-slot bolt.
Figure 2:
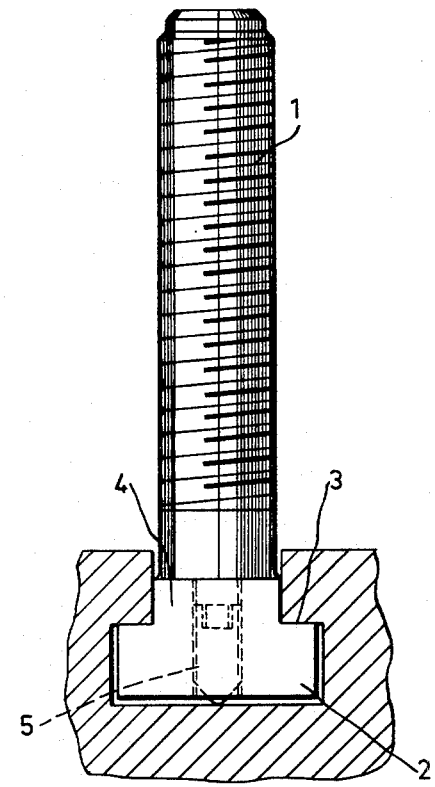
Fig. 2 is a side view of the same bolt, the bolt being fixed in a T-slot by means of locking screws.
Figure 3:
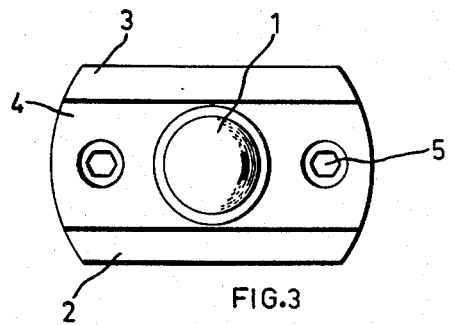
Fig. 3 is a horizontal projection of the bolt according to Figs. 1 and 2.

The T-slot bolt shown in Figs. 1 to 3 consists as usual of a threaded shank 1 and a parallelepipedic head 2. The head is provided on both sides of the shank with a pair of angularly cut-out portions forming on one hand shoulders 3 for contact with the underside of the flanges of the T-slot bolt and on the other a central rib 4 with a sliding fit in the narrow portion of the T-slot.

The head is besides relatively long in the longitudinal direction of the T-slot and provided with a pair of through locking screws 5, one on each side of the shank, where they are accessible through the opening of the T-slot in order to be tightened against the bottom of the T-slot.

When the bolt is to be fixed in the T-slot of a face plate the locking screws are tightened against the bottom of the T-slot, whereby the shoulders 3 of the bolt head are pressed into contact with the corresponding surfaces in the T-slot. Because the shoulders are made carefully plane, the bolt will project at right angles from the face plate.

The advantage of the invention will be particularly apparent when several workpieces of the same kind are to be worked, since the bolts can be used as fixtures and do not have to be directed more than once. Instead, the workpieces may be directed against the bolts, in which case the latter serve as guide pins. Where necessary, the bolts may be provided with bushings fitting the holes in the workpiece. Because of the lateral guiding in the T-slot, a bolt can also if necessary be removed from the slot and returned to exactly the same place by means of an abutment block clamped fast in the slot.

What I claim and desire to secure by Letters Patent is:

1. A T-slot bolt for clamping a workpiece against a face plate having T-slots therein defined by flanges, said bolt comprising a shank threaded at one end, an elongated head on the other end of said shank, said head having plane surfaces thereon perpendicular to the longitudinal axis of said shank and extending longitudinally of said head for contact against the underside of the flanges defining the T-slots and having two threaded holes therethrough parallel to the longitudinal axis of said shank with a setscrew in each hole, said setscrews being disposed symmetrically on each side of said shank between said plane surfaces and adapted to receive a turning tool through said slot so as to be applicable against the bottom of the T-slot for fixing said bolt between the bottom of said slot and said flanges at right angles to the face plate.

2. A T-slot bolt for clamping a workpiece against a face plate having T-slots therein defined by flanges, said bolt comprising a shank threaded at one end, an elongated head on the other end of said shank, said head having plane surfaces thereon perpendicular to the longitudinal axis of said shank and extending longitudinally of said head for contact against the underside of the flanges defining the T-slots and having at least one threaded hole therethrough parallel to the longitudinal axis of said shank with a setscrew therein, said setscrew being disposed symmetrically between said plane surfaces and adapted to receive a turning tool through said slot so as to be applicable against the bottom of the T-slot for fixing said bolt between the bottom of said slot and said flanges at right angles to the face plate.

References Cited in the file of this patent

UNITED STATES PATENTS

| | | |
|---|---|---|
| 1,409,524 | Chase | Mar. 14, 1922 |
| 2,161,271 | Anderson | June 6, 1939 |
| 2,350,585 | Carpenter | June 6, 1944 |
| 2,676,680 | Kindorf | Apr. 27, 1954 |